(No Model.)
H. B. CURRY.
STOCK POKE.
No. 367,026.   Patented July 26, 1887.
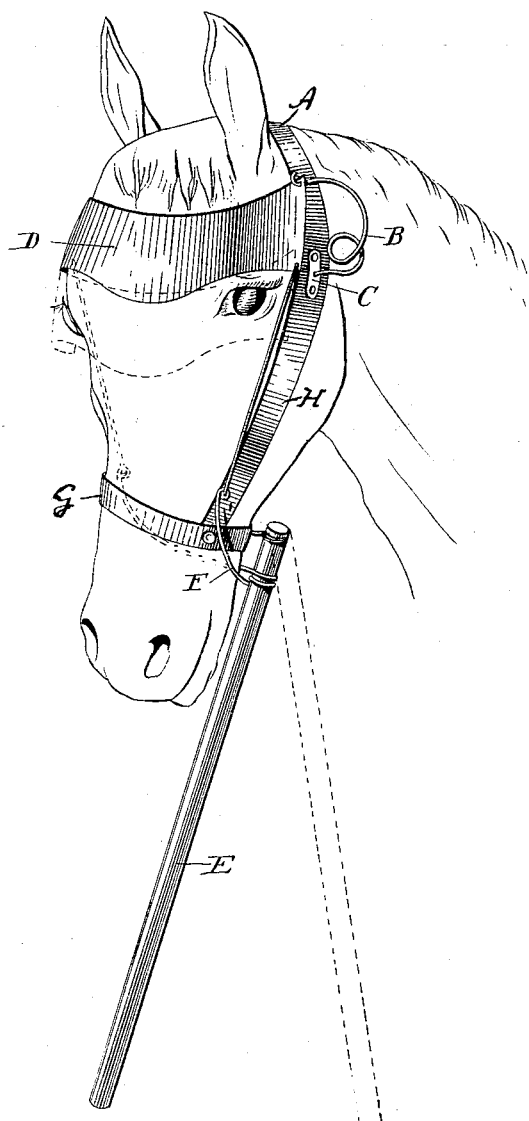
Witnesses
J. A. Rowland
C. B. Walker
Inventor
Henry B. Curry
by W. W. Curry
Atty.

UNITED STATES PATENT OFFICE.

HENRY B. CURRY, OF TROY, WEST VIRGINIA.

STOCK-POKE.

SPECIFICATION forming part of Letters Patent No. 367,026, dated July 26, 1887.

Application filed May 21, 1887. Serial No. 238,975. (No model.)

*To all whom it may concern:*

Be it known that I, HENRY B. CURRY, a citizen of the United States of America, residing at Troy, in the county of Gilmer and State of West Virginia, have invented certain new and useful Improvements in Stock-Pokes, of which the following is a specification, reference being had therein to the accompanying drawing.

My invention relates to animal-pokes, and is designed to prevent the animals from jumping or pushing down fences, and can be used for horses, mules, or cattle.

It consists of a common halter, on which is mounted a movable brow-band by means of two springs, a pole, and a forked wire or rod attachment, by means of which the brow-band is operated, and is thus described, reference being had to the figure of the drawing, which is a perspective view of a horse's head with my device in position, the letters referring to the various parts.

To an ordinary halter of leather or rope, A, are attached two coiled-wire springs, B, one on each side on the cheek-pieces. The lower ends of these springs are firmly inserted in small metal plates C, which are fastened to the cheek-pieces H. A brow-band, D, of such width as may be required for the animal, made of leather or canvas, is attached by the upper corners to the coiled springs, so as to move freely up and down over the face of the animal when operated. A wooden pole or stale, E, has its upper end fastened to the nose-band G of the halter, under the animal's chin, by a cord or leather thong. Near this upper end of the stale is firmly attached a strong wire or rod, F, with arms extending outward and upward along the animal's head, the ends of which are fastened to the lower corners of the brow-band by cords or leather thongs. The cords holding the stale to the halter and the arms of the bifurcated wire to the brow-band are to be of proper length to allow the stale to sway aside, that the head of the animal may reach the ground to feed, and so that it will hang in a line with the nose, the lower end projecting in front when the head is raised. By this arrangement, when the animal approaches a fence to push or jump, the end of the stale comes first into contact, and, acting as a lever on the springs, draws the brow-band over the eyes, shutting off the sight. As soon as the animal desists, the pressure is relieved, the springs relax, the brow-band is drawn up, and vision restored. The pole, hanging loosely from the halter, also operates as a clog, restraining the propensity to jump.

It is a well-known fact that domestic animals will not attempt to jump or push with the eyes bandaged, and it is equally well known that a constant bandage impairs the sight; hence the value of my invention, which shuts off the sight when attempting mischief and restores it again as soon as it desists.

What I claim as my invention, and desire to secure by Letters Patent, is—

In an animal-poke, the combination, with a halter, of a brow-band, coiled-wire springs secured to the upper end thereof and to the cheek-pieces of the halter, a stale secured to the under side of the nose-band, and a bifurcated wire spring secured to the stale and to the lower edge of the movable brow-band, substantially as described, and for the purpose set forth.

In testimony whereof I affix my signature in presence of two witnesses.

HENRY B. CURRY.

Witnesses:
 H. S. MCQUAIN,
 C. B. CONRAD.